United States Patent
Kneckt et al.

(10) Patent No.: US 9,622,266 B2
(45) Date of Patent: Apr. 11, 2017

(54) CONFIGURING SIMULTANEOUS TRANSMISSIONS IN WIRELESS NETWORK

(71) Applicant: Nokia Technologies Oy, Espoo (FI)

(72) Inventors: Jarkko Kneckt, Espoo (FI); Olli Alanen, Vantaa (FI); Mika Kasslin, Espoo (FI); Janne Marin, Espoo (FI); Enrico Henrik Rantala, Berkeley, CA (US)

(73) Assignee: Nokia Technologies Oy, Espoo (FI)

( * ) Notice: Subject to any disclaimer, the term of this patent is extended or adjusted under 35 U.S.C. 154(b) by 156 days.

(21) Appl. No.: 14/627,051

(22) Filed: Feb. 20, 2015

(65) Prior Publication Data
US 2016/0248494 A1  Aug. 25, 2016

(51) Int. Cl.
 *H04W 4/00* (2009.01)
 *H04W 74/08* (2009.01)
 *H04W 16/14* (2009.01)

(52) U.S. Cl.
 CPC ........ *H04W 74/0816* (2013.01); *H04W 16/14* (2013.01)

(58) Field of Classification Search
 CPC ..................... H04B 7/0613; H04W 72/042
 See application file for complete search history.

(56) References Cited

U.S. PATENT DOCUMENTS

| | | | | |
|---|---|---|---|---|
| 2006/0092889 | A1* | 5/2006 | Lyons | H04W 16/08 370/338 |
| 2008/0008147 | A1* | 1/2008 | Nakayama | H04W 72/082 370/338 |
| 2008/0254745 | A1* | 10/2008 | Zhang | H04W 16/14 455/41.2 |
| 2010/0135238 | A1* | 6/2010 | Sadri | H04W 72/0453 370/329 |
| 2011/0205961 | A1* | 8/2011 | Santivanez | H04W 74/0816 370/328 |
| 2012/0106436 | A1* | 5/2012 | Argyriou | H04W 74/0816 370/315 |
| 2012/0250632 | A1* | 10/2012 | Mo | H04W 74/006 370/329 |
| 2014/0133435 | A1* | 5/2014 | Forenza | H04B 7/0626 370/329 |
| 2014/0376453 | A1* | 12/2014 | Smith | H04W 74/0816 370/328 |

\* cited by examiner

*Primary Examiner* — Clemence Han
(74) *Attorney, Agent, or Firm* — Harrington & Smith

(57) ABSTRACT

This document discloses some embodiments for configuring simultaneous transmissions in a wireless network. According to an aspect, a method including: detecting, by a first apparatus of a first wireless network on the basis of a first criterion, that transmissions performed simultaneously with a second apparatus of a second wireless network are allowed; determining, on the basis of a second criterion different from the first criterion, to prohibit frame transmissions simultaneous with frame transmissions of the second apparatus; upon the determining, causing transmission of a control message in the first wireless network, wherein the control message includes an instruction to refrain from transmissions simultaneously with the second apparatus.

18 Claims, 7 Drawing Sheets

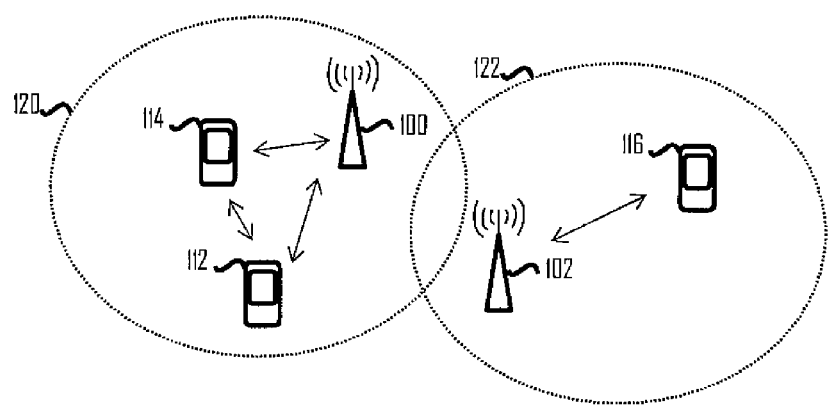
Fig 1
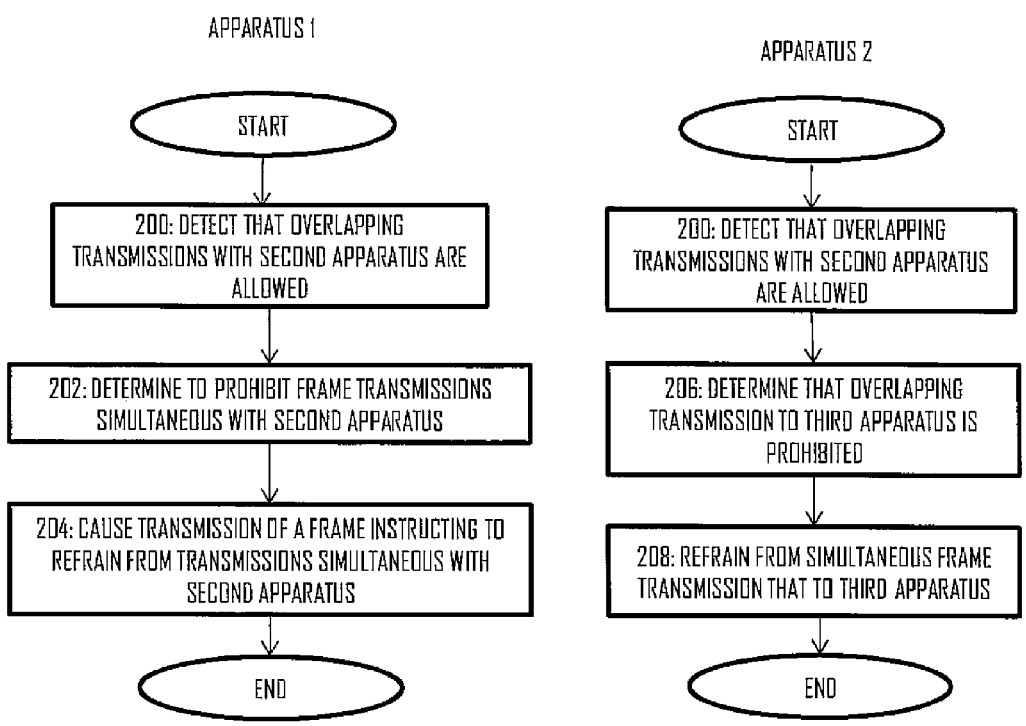
Fig 2A
Fig 2B

CONFIGURING SIMULTANEOUS TRANSMISSIONS IN WIRELESS NETWORK

FIELD

The invention relates to the field of wireless networks and, particularly, to managing overlapping transmissions in a wireless network.

BACKGROUND

In some wireless networks, a plurality of wireless devices may attempt to access a transmission medium at the same time. The channel access may comprise sensing the channel for pending transmissions. If the transmission medium is sensed to be busy, a wireless device may back off and attempt the channel access after the channel is sensed to be available. Allowing overlapping transmissions may improve spectrum efficiency but induce interference unless managed properly. A node of a first wireless network may allow nodes of a second wireless network to carry out transmissions simultaneously with at least one node of the first wireless network, wherein said node may transmit a control message indicating the allowance of the overlapping transmissions.

BRIEF DESCRIPTION

According to an aspect of the invention, there is provided a method comprising: detecting, by a first apparatus of a first wireless network on the basis of a first criterion, that transmissions performed simultaneously with a second apparatus of a second wireless network are allowed; determining, on the basis of a second criterion different from the first criterion, to prohibit frame transmissions simultaneous with frame transmissions of the second apparatus; upon said determining, causing transmission of a control message in the first wireless network, wherein the control message comprises an instruction to refrain from transmissions simultaneously with the second apparatus.

According to another aspect of the invention, there is provided a method comprising: detecting, by a first apparatus of a first wireless network, that transmissions performed simultaneously with a second apparatus are allowed; determining, in the first apparatus on the basis of a set of rules comprising at least one rule, that a frame transmission, simultaneous with a frame transmission of the second apparatus, to a third apparatus of the first wireless network is prohibited; in response to said determining, refraining the transmission to the third apparatus at least for the duration of the frame transmission of second apparatus.

According to another aspect of the invention, there is provided a computer program product embodied on a distribution medium readable by a computer and comprising program instructions which, when loaded into an apparatus, execute any one of the above-described methods or any other method described in this document.

According to another aspect of the invention, there is provided an apparatus comprising: at least one processor and at least one memory including a computer program code, wherein the at least one memory and the computer program code are configured, with the at least one processor, to cause the apparatus to: detect, on the basis of a first criterion, that transmissions performed in a first wireless network simultaneously with a second apparatus of a second wireless network are allowed; determine, on the basis of a second criterion different from the first criterion, to prohibit frame transmissions simultaneous with frame transmissions of the second apparatus; upon said determining, cause transmission of a control message in the first wireless network, wherein the control message comprises an instruction to refrain from transmissions simultaneously with the second apparatus.

According to another aspect of the invention, there is provided an apparatus comprising at least one processor and at least one memory including a computer program code, wherein the at least one memory and the computer program code are configured, with the at least one processor, to cause the apparatus to: detect that transmissions performed in a first wireless network simultaneously with a second apparatus are allowed; determine, on the basis of a set of rules comprising at least one rule, that a frame transmission, simultaneous with a frame transmission of the second apparatus, to a third apparatus of the first wireless network is prohibited; in response to said determining, refrain the transmission to the third apparatus at least for the duration of the frame transmission of the second apparatus.

Embodiments of the invention are defined in the dependent claims.

LIST OF DRAWINGS

Embodiments of the present invention are described below, by way of example only, with reference to the accompanying drawings, in which FIG. 1 illustrates a wireless communication scenario to which embodiments of the invention may be applied;

FIGS. 2A and 2B illustrate diagrams of procedures for configuring simultaneous transmissions in a wireless network according to an embodiment of the invention;

FIGS. 3A, 3B, and 4 illustrate embodiments for preventing overlapping transmissions in a wireless network according to some embodiments of the invention;

DESCRIPTION OF EMBODIMENTS

Figure 3A:
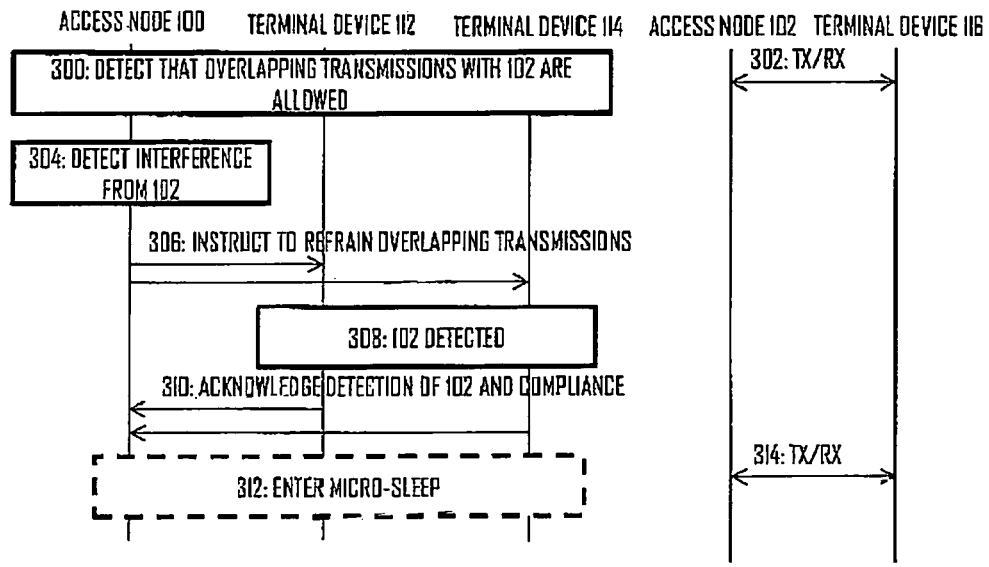

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

A general wireless communication scenario to which embodiments of the invention may be applied is illustrated in FIG. 1. FIG. 1 illustrates wireless communication devices comprising access points (AP) 100, 102 and a plurality of terminal devices (STA) 112, 114, 116. The AP 100, 102 may be a stationary access point or a mobile access point. A general term used in this specification and encompassing both the APs and STAs is a wireless device. The access point may refer to an access point specified in IEEE 802.11 specifications or to a base station of another wireless access network. The mobile access point may have a functionality of a STA as well. A common term encompassing both the stationary APs and mobile APs is an access node. An access node may provide or be comprised in a basic service set (BSS) which is a basic building block of an IEEE 802.11 wireless local area network (WLAN). Each access node may represent a different BSS. A BSS may be considered as a wireless network, and different BSSs as different wireless networks. A single access node may, however, establish a plurality of BSSs. The most common BSS type is an infrastructure BSS that includes a single access node together with all STAs associated with the access node. The access node may provide access to other networks, e.g. the Internet. In another embodiment, the BSSs may be connected with each other by a distribution system (DS) to form an extended service set (ESS). An independent BSS (IBSS) is formed by an ad hoc network of terminal devices without a stationary controlling AP. In a context where two BSSs have overlapping coverage areas, one BSS may be considered as an overlapping BSS (OBSS) from the viewpoint of the other BSS. While embodiments of the invention are described in the context of the above-described topologies of IEEE 802.11, it should be appreciated that these or other embodiments of the invention may be applicable to wireless networks based on other specifications, e.g. WiMAX (Worldwide Interoperability for Microwave Access), UMTS LTE (Long-term Evolution for Universal Mobile Telecommunication System), mobile ad hoc networks (MANET), mesh networks, and other networks having cognitive radio features, e.g. transmission medium sensing features and adaptive capability to coexist with radio access networks based on different specifications and/or standards. Some embodiments may be applicable to networks having features under development by other IEEE task groups. Therefore, the following description may be generalized to other systems as well.

The different access nodes 100, 102 may operate at least partly on different channels, e.g. on different frequency channels. In other scenarios, the access nodes 100, 102 may operate on the same frequency channels. IEEE 802.11n specification specifies a data transmission mode that includes 20 megahertz (MHz) wide primary and secondary channels. The primary channel is used in all data transmissions, with clients supporting only the 20 MHz mode and with clients supporting higher bandwidths. A further definition in 802.11n is that the primary and secondary channels are adjacent. The 802.11n specification also defines a mode in which a STA may, in addition to the primary channel, occupy one secondary channel which results in a maximum bandwidth of 40 MHz. IEEE 802.11ac task group extends such an operation model to provide for wider bandwidths by increasing the number of secondary channels from 1 up to 7, thus resulting in bandwidths of 20 MHz, 40 MHz, 80 MHz, and 160 MHz. A 40 MHz transmission band may be formed by two contiguous 20 MHz bands, and an 80 MHz transmission band may be formed by two contiguous 40 MHz bands. However, a 160 MHz band may be formed by two contiguous or non-contiguous 80 MHz bands. Different BSSs may employ different primary channels.

As mentioned above, the transmission band of a BSS contains the primary channel and zero or more secondary channels. The secondary channels may be used to increase data transfer capacity of a transmission opportunity (TXOP). The secondary channels may be called a secondary channel, a tertiary channel, a quaternary channel, etc. However, let us for the sake of simplicity use the secondary channel as the common term to refer also to the tertiary or quaternary channel, etc. The primary channel may be used for channel contention, and a TXOP may be gained after successful channel contention on the primary channel. Some IEEE 802.11 networks are based on carrier sense multiple access with collision avoidance (CSMA/CA) for channel access. Some networks may employ enhanced distributed channel access (EDCA) which provides quality-of-service (QoS) enhancements to medium access control (MAC) layer. The QoS enhancements may be realized by providing a plurality of access categories (AC) for prioritizing frame transmissions. The access categories may comprise the following priority levels in the order of increasing priority: background (AC_BK), best effort (AC_BE), video streaming (AC_VI), and voice (AC_VO). A higher priority frame transmission may use a shorter contention window and a shorter arbitration inter-frame spacing (AIFS) that result in higher probability of gaining the TXOP. Furthermore, some networks may employ restricted access windows (RAW) where a reduced set of wireless devices of the wireless network may carry out channel contention. The access node may define the RAW and a group of wireless devices that are allowed to attempt the channel access within the RAW. Grouping allows partitioning of the wireless devices into groups and restricting channel access only to wireless devices belonging to a specified group at any given time period. The time period may be enabled by allocating slot duration and a number of slots in RAW access. The grouping may help to reduce contention by restricting access to the medium only to a subset of the wireless devices. The grouping may also reduce the signalling overhead.

As described above, the BSS may be represented by the access node and one or more terminal devices connected to the access node. In the example of FIG. 1, the access node 100 and the terminal devices 112, 114 may be comprised in the first BSS and, thus, in the same wireless network while other terminal devices and access nodes (not shown) may be comprised in a second BSS which may be a neighbour to the first BSS and an OBSS with respect to the first BSS. This is a common situation in dense deployment scenarios where multiple overlapping wireless networks have been installed. The first BSS and the second BSS may be overlapping BSSs in the sense that at least some of the devices first BSS are capable of receiving frames from the second BSS and vice versa.

With respect to the definition of the wireless network in the context of the present description, the wireless network may comprise a single BSS or a plurality of BSSs. According to a viewpoint, the wireless network may comprise a plurality of BSSs that have the same service set identifier (SSID) the same roaming identifier, and/or the same roaming partnership.

A terminal device may establish a connection with any one of the access nodes it has detected to provide a wireless connection within the neighbourhood of the terminal device. In the example of FIG. 1, let us assume a situation where the terminal devices 112, 114 located within a coverage area of the access node 100 establish a connection to that access node 100. The connection establishment may include authentication in which an identity of the terminal device is established in the access node. The authentication may comprise exchanging an encryption key used in the BSS. After the authentication, the access node and the terminal device may carry out association in which the terminal device is fully registered in the BSS, e.g. by providing the terminal device with an association identifier (AID). It should be noted that in other systems terms authentication and association are not necessarily used and, therefore, the association of the terminal device to an access node should be understood broadly as establishing a connection between the terminal device and the access node such that the terminal device is in a connected state with respect to the access node and scanning for downlink frame transmissions from the access node and its own buffers for uplink frame transmissions.

In a conventional 802.11 network, a wireless device initiating a TXOP may transmit a frame that triggers a network allocation vector (NAV). The frame may be a control frame such as a request-to-send (RTS) frame or a data frame. The frame may comprise a Duration field defining the duration of the NAV. Any other wireless device detecting the frame and extracting the Duration field suspends access to the same channel for the duration of the NAV. This mechanism may reduce simultaneous transmissions in the proximity that may be renamed as collisions. In some collisions the receiver cannot receive transmissions resulting to wasted transmission resources. The 802.11 networks may employ another collision avoidance mechanism called clear-channel assessment (CCA). A wireless device trying to access the channel scans for the channel before the access. If the channel is sensed to contain radio energy that exceeds a CCA threshold, the wireless device refrains from accessing the channel. If the channel is sensed to be free and no NAV is currently valid, the wireless device may access the channel. A conventional value for the CCA threshold may be −82 decibel-milliwatts (dBm) or −62 dBm depending on a channel access scheme, for example.

The wireless devices 110, 112, 114 may employ a randomized back-off time defining a minimum time interval they refrain from frame transmissions after detecting that the channel is busy. During the channel sensing, the back-off time may be decremented while the channel is sensed to be idle or available for the channel access. When the back-off time reduces to zero and the channel is still sensed to be idle, the wireless device may carry out the frame transmission. The back-off time value may be maintained for the duration the channel is sensed to be busy and, in some systems, for a determined guard time interval (e.g. the AIFS) after the detection that the channel has become idle.

In dense deployment scenarios with multiple overlapping wireless networks operating at least partially on the same channel(s), constant backing off may be a reality and it may cause inefficiency in the spectrum utilization. On the other hand, uncontrolled overlapping transmissions potentially increase interference and cause degradation of the performance of the wireless networks. As a consequence, a scheme for enabling overlapping transmissions in a controlled manner may be advantageous.

Some wireless networks enable overlapping simultaneous transmissions. Such a procedure may comprises operations performed in a first wireless device, e.g. the access node 102, and operations performed in a second wireless device, e.g. the terminal device 114 or 116. Referring to FIG. 2, the access node may perform a clear-channel assessment procedure in which a channel is determined to be idle if no signal having a signal strength exceeding a threshold is detected. According to another viewpoint, the access node 102 performs a clear-channel assessment procedure in which a channel is determined to be idle if radio energy detected in a channel does not exceed the threshold. In response to determining that the channel is idle, the access node 102 initiates a transmission interval. The transmission interval may be a transmission opportunity (TXOP) of the Wi-Fi/IEEE 802.11 networks. The access node 102 generates a frame during the transmission interval. The frame comprises an information element indicating that another apparatus of the same or different wireless network is allowed to carry out transmission overlapping with the transmission interval. The access node 102 then transmits the frame. Meanwhile, the terminal device 114, 116 has been scanning the channel(s) of its wireless network for frame transmissions. Let us assume that wireless networks 120, 122 operate on the same channel so that the terminal device 114 is able to detect transmissions of the access node. As a consequence, the terminal device 114, 116 detects the frame and extracts at least a header of the frame, the header comprising the information element. Upon extracting the information element, the terminal device detects that the overlapping transmission is allowed during the transmission interval. In response to the information element, the terminal device 114, 116 employs a first threshold mapped to the information element in a clear-channel assessment procedure in which a channel is determined to be idle if no signal having a signal strength exceeding the first threshold is detected. In response to determining that the channel is idle, the terminal device initiates a transmission interval overlapping with the transmission interval of the access node.

In some embodiments, the communication described in the previous paragraph may be carried out between two access nodes.

The first threshold may be the CCA threshold, and it may be associated with signal strength higher than what is used in a case where the overlapping transmissions are not allowed, e.g. a CCA threshold of −62 dBM may be used when the overlapping transmissions are allowed and −82 dBM when the overlapping transmissions are not allowed. As a consequence, the device initiating the overlapping transmission gains determines the channel to be idle more probably in the case where the overlapping transmissions are allowed than in the case where the overlapping transmissions are not allowed.

The overlapping transmission may refer to a frame transmission that is carried out simultaneously and on the same frequency channel, e.g. on the same primary channel, as another frame transmission.

A device may indicate the allowance of the overlapping transmissions by transmitting a frame comprising in its header an information element indicating whether or not the device allows overlapping transmissions. The information element may comply with a Color field defined in IEEE 802.11ah specifications or another similar field. The field may comprise three or more bits. The field may be present in an S1G field of a preamble of a physical layer convergence protocol (PLCP) protocol data unit (PPDU). The field may have values from 0 to 7, wherein one value is used when the frame is a control frame and the value indicates that overlapping transmissions are not allowed. The other values may indicate that overlapping transmissions are allowed. The other values may be distributed between access nodes of neighbouring or overlapping wireless networks in a determined manner in order to enable a terminal device to identify an access node of its own wireless network from the field. Accordingly, the terminal device may carry out overlapping transmissions upon detecting a value that allows the overlapping transmissions and is not a value used by the access node of its own wireless network. Upon detecting a value that allows the overlapping transmissions and is the value used by the access node of its own wireless network, the terminal device may prevent the overlapping transmission. The access nodes may negotiate about the values or a centralized controller may allocate a unique value for each access node. The S1G field may further comprise parameters enabling a receiver of the frame to decide under which circumstances the channel is considered to be busy and the overlapping transmission shall not be triggered even though the field indicates allowance of the overlapping transmissions. For example, if the terminal device 112 detects a frame that allows overlapping transmissions but that the frame is an uplink transmission to the access node 100, the terminal device may prevent overlapping transmission to the access node 100. Similarly, the terminal device may prevent overlapping transmission with the access node of its own access node.

In general, two wireless networks 120, 122 having overlapping coverage areas may enable overlapping transmissions. Accordingly, a device of a first wireless network may be allowed to transmit simultaneously with a device of a second wireless network. This may improve channel utilization and spectral efficiency but it may cause problems because a receiver of the first wireless network may experience interference from the second wireless network as stronger than the transmitting device of the first wireless network. Accordingly, throughput may be decreased under some scenarios.

FIGS. 2A and 2B illustrate procedures for preventing transmissions that are potentially interfered in the case where overlapping transmissions are allowed between devices of two different wireless networks. The process may be carried out between two apparatuses of the same wireless network, e.g. between an access node 100 and a terminal device 112 or 114 or between two terminal devices 112 and 114. FIG. 2A illustrates a viewpoint of an apparatus (Apparatus 1) that prohibits another apparatus to carry out overlapping frame transmissions, and FIG. 2B illustrates a viewpoint of an apparatus (Apparatus 2) that refrains from overlapping frame transmissions. Referring to FIG. 2A and according to an aspect, the process comprises in an apparatus of a first wireless network: detecting on the basis of a first criterion that transmissions performed simultaneously with an apparatus of a second wireless network are allowed (block 200); determining, on the basis of a second criterion different from the first criterion, to prohibit frame transmissions simultaneously with the apparatus of the second wireless network (block 202); upon said determining, causing transmission of a control message in the first wireless network, wherein the control message comprises an instruction to refrain from transmissions simultaneously with the apparatus of the second wireless network (block 204).

According to another aspect, the process of FIG. 2B comprises in an apparatus of the first wireless network: detecting that transmissions performed simultaneously with an apparatus of a second wireless network are allowed (block 200); determining, on the basis of a set of rules comprising at least one rule, that a frame transmission, simultaneous with a frame transmission of the apparatus of the second wireless network, to a third apparatus of the first wireless network is prohibited (block 206); and in response to said determining, refraining the transmission to the third apparatus at least for the duration of the frame transmission of the apparatus of the second wireless network (block 208). The embodiment of FIG. 2A enables the Apparatus 1 to instruct one or more other devices of the first wireless network to refrain from simultaneous frame transmissions in a situation where there is an on-going frame transmission from a source of the second wireless network that is considered to interfere with frame reception in an apparatus of the first wireless network and in a situation where overlapping transmissions with the source are allowed, e.g. through the Color scheme described above. Accordingly, the devices of the first wireless network will not attempt an overlapping transmission that will probably be received erroneously or not detected at all in an intended receiver. The intended receiver may be the Apparatus 1 or another apparatus of the first wireless network. This type of prevented overlapping transmission further saves the power of the devices of the first wireless network. In some embodiments described below, one or more of the devices of the first wireless network may be configured to enter a power-save mode for the duration of such an interfering transmission to further save power.

The embodiment of FIG. 2B enables the Apparatus 2 to prevent simultaneous frame transmissions in the above-described situation. The rules may be pre-defined rules, e.g. provided by an access node of the first wireless network, as described below.

In an embodiment, block 200 is based on detecting a frame from the apparatus of the second wireless network, wherein the frame comprises an information element explicitly allowing overlapping frame transmissions, e.g. the Color field having a value indicating allowed overlapping transmissions. As a consequence, the first criterion is the detection of the explicit indication of allowance from the apparatus of the second wireless network.

In another embodiment, block 200 is based on channel measurements performed in connection with the CCA procedure or a similar measurement procedure. The apparatus(es) executing block 200 may measure radio energy present in a channel and identify a transmitter of the radio energy, e.g. by extracting an identifier from a header of a frame associated with the radio energy. If the radio energy is below a determined threshold, e.g. a CCA threshold, the apparatus may determine that the overlapping transmissions with the identified transmitter are allowed. On the other hand, if the radio energy is above the determined threshold, e.g. the CCA threshold, the apparatus may determine that the overlapping transmissions with the identified transmitter are not allowed. Each apparatus performing block 200 in a system, e.g. in the first wireless network, may employ the same threshold, or the threshold may be a dynamic parameter in which case different apparatuses may employ different thresholds. In this embodiment, the apparatuses may use detection of the NAV as an additional factor for determining whether or not the overlapping transmissions are allowed, or the apparatuses may disregard any NAV detected. In this embodiment, the first criterion is comparison of the channel measurements with the threshold.

Yet another embodiment is a combination of the channel measurements and the detection of the frame from the apparatus of the second wireless network, the frame carrying the information element allowing overlapping frame transmissions. In an embodiment, the apparatus performing block 200 may employ the measurements only in the case the apparatus of the second wireless network allows overlapping transmissions.

In an embodiment, the second criterion is based on channel measurements, as further elaborated below. When combined this with the embodiment where the first criterion is also the channel measurements, the measurement criterion may be different in the first criterion than in the second criterion.

In an embodiment, the apparatus of the second wireless network is an access node or an access point of the second wireless network. In a further embodiment, the process of FIGS. 2A and/or 2B may be carried only with respect to access node(s) of the second wireless network. In other words, block 200 may comprise determining that frame transmissions that overlap with frame transmissions of the access node(s) of the second wireless network are allowed, and block 202 may comprise determining that the overlapping frame transmissions with the access node(s) of the second wireless network shall not be performed. In another embodiment, the apparatus of the second wireless network is a terminal device of the second wireless network. In such an embodiment, the process of FIGS. 2A and/or 2B may be performed with respect to both access node(s) and terminal device(s) of the second wireless network.

Figure 3B:
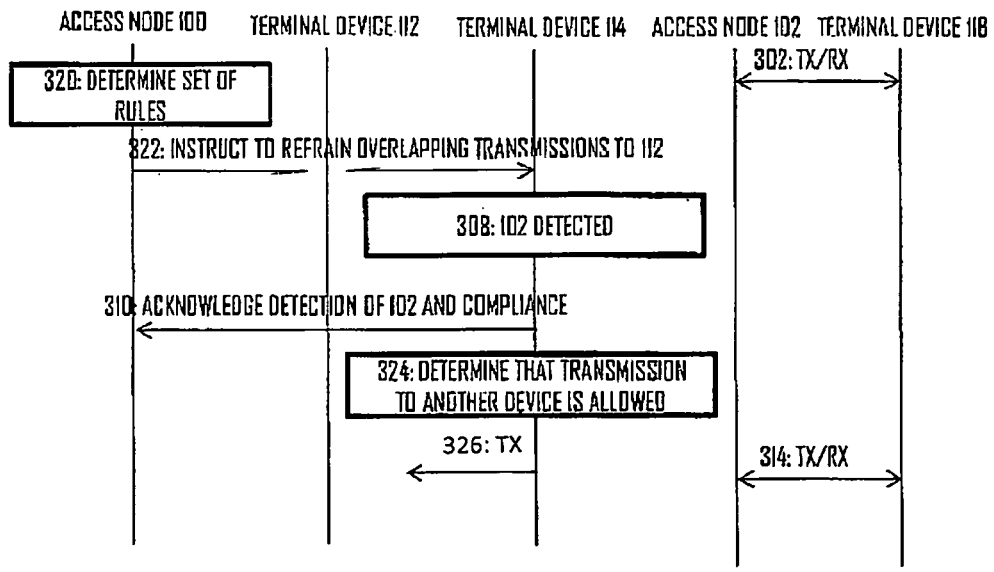
Figure 4:
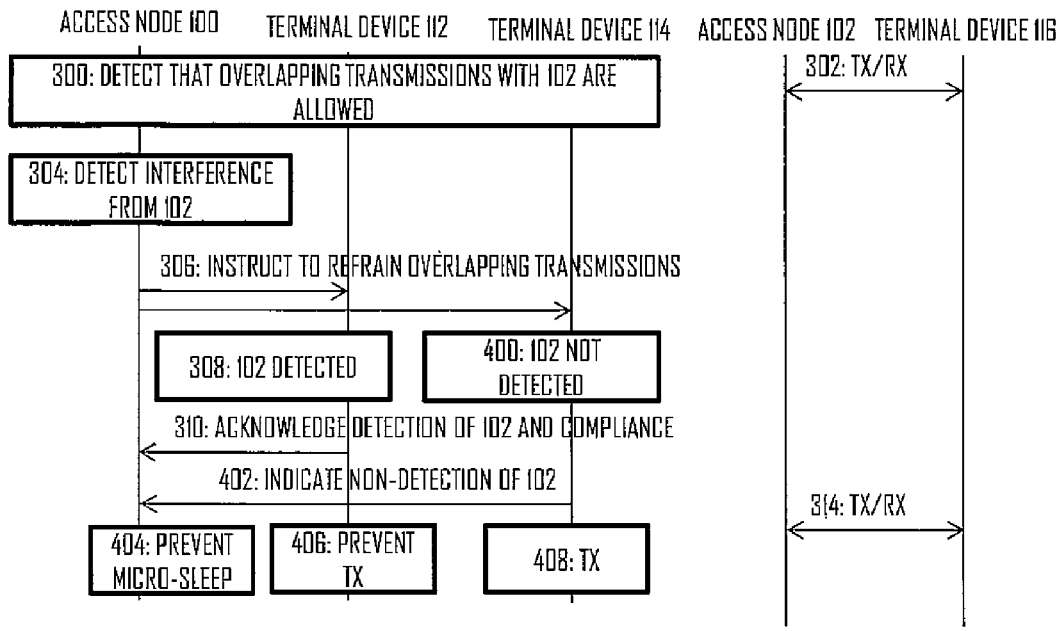
Figure 5:
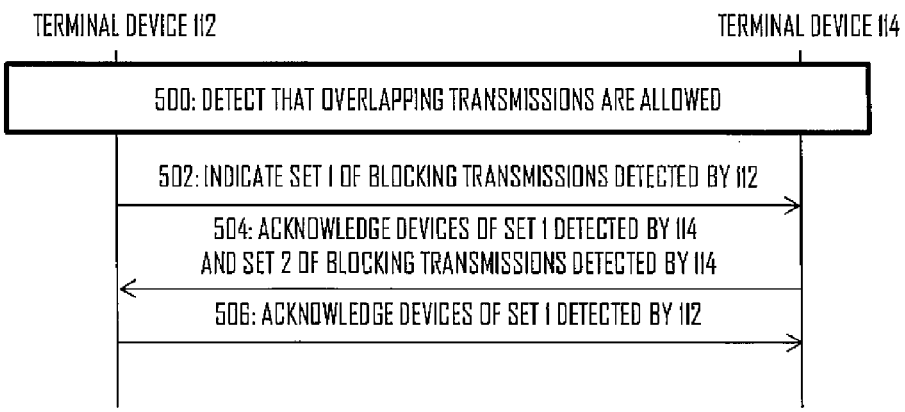
FIG. 5 illustrates an embodiment of a procedure for negotiating about overlapping transmissions between two peer devices of a wireless network according to an embodiment of the invention.

Let us now describe some further embodiments of FIGS. 2A and 2B with reference to signalling diagrams in FIGS. 3A to 5. The signalling diagrams illustrate operation of the apparatuses of FIG. 1. FIGS. 3A, 3B, and 4 illustrate operation in a situation where an access node instructs to refrain from overlapping transmissions, and FIG. 5 illustrates communication between two terminal devices in the context where the terminal devices autonomously agree to refrain from overlapping transmissions. In all Figures steps or operations denoted by the same reference numbers represent the same or substantially similar operations that may be performed in the same apparatus or in different apparatuses.

Referring to FIG. 3A, the access node 100 and the terminal devices 112, 114 detect in block 300 that overlapping transmissions with the access node 102 are allowed. The detection in block 300 may be based on detecting a frame transmitted by the access node 102, wherein the frame comprises an information element indicating that the access node 102 allows transmissions overlapping with the frame. Such a frame may be a frame transmitted from the access node 102 to the terminal device 116 in step 302. In other embodiments, the detection in block 300 may be based on an estimate of whether or not there is interference between devices of the two wireless networks 120, 122 that blocks correct reception of frames. There may be other criteria for making the detection in block 300.

In block 304, the access node 100 detects that the access node 102 is a potential source of too high interference towards the access node 100 itself 100 and/or towards the wireless network 120. The detection may be based on measurements of a signal received from the access node 102. The access node 100 may measure a first signal strength value from a signal received from the access node 102 and a second signal strength value from a signal received from a node of the wireless network 120, e.g. from the terminal device 112 or 114. Then, the access node may estimate a signal-to-interference ratio, wherein the first signal strength value represents the interference and the second signal strength value represents the signal in the estimation. The estimated signal-to-interference ratio may be compared with a determined threshold and, if the ratio is below the threshold, the interference may be considered to block correct reception of frames. Thus, the overlapping transmissions may be prevented. If the ratio is above the threshold, the signal strength may be considered to be sufficiently high with respect to the interference strength so that the overlapping transmission may be allowed. Such a signal to interference ratio (SIR) estimation as such is known in the art and the description of the actual algorithm is now omitted. In another embodiment, the access node 100 uses another criterion in block 304. The other criterion may comprise an estimate of a bit error rate, a frame error rate, or a block error rate in a case of receiving or transmitting a frame that overlaps with a frame transmission of the access node 102. Block 304 may comprise making a decision that the frame transmission in the wireless network 120 that overlaps with a frame transmission of the access node 102 (or with a frame transmission in the wireless network 122) is susceptible to erroneous reception because of interference from the wireless network 120. In an embodiment, the block 304 comprises the access node 100 making a decision that the interference may cause erroneous reception of a frame transmission in the access node 100. As a consequence, the access node may transmit the frame instructing the devices of the wireless network 120 to refrain from frame transmission that overlap with frame transmissions by the access node or, in general, a device specified in the transmitted frame (step 306). The frame comprising such an instruction may be transmitted to a broadcast address, a multicast address, or as one or more unicast frames each addressed to an individual address of a terminal device of the wireless network 120.

In an embodiment, the frame transmitted in step 306 comprises said instruction to refrain from frame transmissions and an identifier of the device with which the overlapping transmissions are prohibited, e.g. an identifier of the access node 102 in the example of FIG. 3. The identifier may be an address of the device which may be considered as a transmitter address or a receiver address. In other embodiments, the device(s) may be identified with a group identifier, an association identifier, or a partial association identifier.

In block 308, each terminal device 112, 114 determines that it is able to detect transmissions of the access node 102. The determination may be based on earlier detection of a frame transmitted by the access node 102. As a consequence, the terminal devices 112, 114 may each transmit a response to the frame received in step 306. The response may comprises an indication that the terminal device 112, 114 is able to detect the transmissions associated with the access node 102, e.g. comprising an identifier associated with the access node 102, and is able to comply with the instruction to refrain transmissions overlapping with the transmissions of the access node (step 310). Upon receiving the responses from the terminal devices 112, 114, e.g. all the terminal devices of the wireless network 120, the access node may validate that the terminal devices 112, 114 are able to comply with the instruction. Therefore, upon detecting a frame transmission 314 by the access node 102, the access node 100 and the terminal devices 112, 114 may enter a power-save mode for the duration of at least the detected frame transmission (block 312). The power-save mode may be a micro-sleep mode, which may be understood as an unscheduled power-save event triggered upon detecting a frame transmission that occupies the channel. In other embodiments, at least one of the devices 100, 112, 114 may perform other functions instead of entering the power-save mode. Such other functions may include operating in another wireless network, for example.

FIG. 3B illustrates an embodiment where the access node 100 provides the terminal device(s) 112, 114 with a set of rules to apply in connection with overlapping transmissions. The rules may be based on measurements carried out by the access node 100 itself or measurements carried out by the terminal devices 112, 114. Let us assume a situation where the terminal device 112 has measured that it cannot ensure correct reception of frames from the terminal device 114 when the access node 102 is transmitting. This may be based on measurements described above in connection with block 304, e.g. the terminal device may perform SIR estimations for signals measured from the access node 102 and from the terminal device 114. The terminal device may then report to the access node 100 that it cannot detect frame transmissions from the terminal device 114 while the access node 102 is transmitting. The access node 100 may then create a rule in block 320, the rule defining that the terminal device 114 shall not carry out overlapping transmissions to the terminal device 112 while the access node 102 is transmitting. The access node may create the same rule on the basis of another criterion, e.g. based on known locations of the terminal device 112 and the access node or through measurements the access node 100 has made on its own. The access node may create other rules in block 320.

In step 322, the access node 100 transmits the set of rules to the terminal devices of the wireless network 120. The set of rules may comprise the above-mentioned rule that instructs the terminal device 114 to which the rules is addressed to refrain from overlapping transmissions towards the terminal device 112 identified in the rule when the access node 102 also identified in the rule is transmitting. The terminal device 114 may acknowledge the detection of the access node 102 and compliance with the rule in the above-described manner. The terminal device 114 may then determine that transmission to another device, e.g. another device of the wireless network 120 or a device of another wireless network, is possible while the access node is transmitting (block 324). Upon detecting a frame transmission 314 of the access node 102, the terminal device 114 may make a decision not to transmit to the terminal device 112 because of the rule and, further decide to carry out frame transmission (TX) to the other device (step 326) during the frame transmission 314.

In another embodiment, the terminal device 114 may determine at least one rule without the access node, e.g. the terminal devices 112, 114 may exchange information necessary to create the rules according to a scheme descrbied in connection with FIG. 5 below.

FIG. 4 illustrates an embodiment where one of the terminal devices 112, 114 of the wireless network 120 is not able to detect frame transmissions from the device with which the overlapping transmissions are prohibited by the access node 100. Referring to FIG. 4, upon receiving the frame instructing the terminal device 114 to refrain from frame overlapping transmissions with respect to the access node 102 in step 306, the terminal device 114 may determine that it is not able to detect frame transmissions from the access node 102 (block 400). Block 400 may be based on determining that the terminal device 114 has not detected any frames comprising an identifier of the access node 102 or that the terminal device 114 has not detected any frames comprising an identifier of the access node 102 within a determined time interval. As a consequence, upon carrying out block 400, the terminal device 114 transmits a response to the frame received in step 306, wherein the response indicates that the terminal device 114 is not able to detect frame transmissions from the access node 102. Upon detecting that at least one terminal device cannot detect the identified interfering device 102 and may, thus, carry out transmissions that overlap with the interfering device (block 408), the access node 100 may stand by to receive frames from such a terminal device. As a consequence, the access node 100 may prevent the power-save mode (block 404) or prevent operation in another wireless network during the transmission (step 314) carried out by the interfering device. The terminal device 112 able to detect the frame transmissions from the interfering device may prevent the overlapping transmissions with the interfering device (block 406).

In an embodiment, the access node 100 may determine per each terminal device whether or not a device of the other wireless network that allows overlapping transmissions actually blocks the transmissions with the access node. For example, the access node 102 may block the transmissions between the access node 100 and the terminal device 112 but not between the access node 100 and the terminal device 114. As a consequence, the access node 100 may instruct the terminal device 112 to refrain from transmissions overlapping with transmissions of the access node 102 but allow frame transmissions with the terminal device 114 such that they overlap with transmissions of the access node 102.

The process of any one of FIGS. 2 to 4 may be carried out periodically and/or upon detecting a change in the interference scenario. In a case where it is determined that the terminal device(s) is/are highly mobile, the procedure may be disabled. The mobility may be determined on the basis of a measured speed of the terminal device or by the time interval the terminal device stays in one wireless network. If the terminal device changes the wireless network more rapidly than a determined threshold, the process may be disabled.

FIG. 5 illustrates an embodiment that may be used in connection with peer-to-peer transmissions in a wireless network, e.g. transmissions between the terminal devices 112, 114 of the same wireless network 120. Referring to FIG. 5, the procedure comprises block 500 in which the terminal devices both detect that overlapping transmissions with an apparatus of another wireless network are allowed. Block 500 may be similar to block 300 or block 200 with respect to how the detection is made. Each terminal device 112, 114 may then carry out measurements and autonomously determine whether one or more devices, with which the overlapping transmissions are allowed, causes interference that blocks correct reception of frames in the terminal device 112, 114. The determination may be based on the signal-to-interference ratio estimation and comparison with the threshold, for example. The signal to-interference ratio estimation may be carried out by measuring a signal received from the terminal device 114 and interference measured from a device of the other wireless network with which the overlapping transmission is allowed. In step 502, the terminal device 112 transmits a frame to the terminal device 114, the frame comprising a first set of identifiers comprising identifier(s) of that or those devices that the terminal device 112 determines to block correct reception of frames from the terminal device 114. Upon receiving the frame, the terminal device 114 determines whether or not it is able to detect all the devices of the first set of identifiers. The terminal device 114 then generates a response frame indicating which device(s) of the first set of identifiers are detectable by the terminal device and, additionally, indicating a second set of identifiers comprising identifier(s) of that or those devices that the terminal device 114 determines to block correct reception of frames from the terminal device 112. This determination may be carried out in the same manner as described above, e.g. signal-to-interference ratio estimation. The response frame is then transmitted form the terminal device 114 to the terminal device 112. Upon receiving the second set of identifiers, the terminal device 112 may determine whether or not it is able to detect all the devices of the second set of identifiers. The terminal device 112 then generates a response frame indicating which device(s) of the second set of identifiers are detectable by the terminal device 112. The response frame is then transmitted form the terminal device 112 to the terminal device 114. When the terminal devices 112, 114 have negotiated the devices for which the overlapping transmissions are prevented and detectable by both devices, the terminal devices 112, 114 may employ the micro-sleep or operate in the other wireless network during such transmissions. On the other hand, if there is an interfering device that allows overlapping transmissions, causes interference towards one of the terminal devices 112, 114 but is not detectable by both terminal devices 112, 114, the terminal devices 112, 114 may stand by for frame transmissions or transmit frames that overlap with a transmission carried out by the interfering device.

The process of FIG. 5 may be carried out periodically and/or upon detecting a change in the interference scenario. In a case where it is determined that the terminal device(s) are highly mobile, the procedure of FIG. 5 may be disabled. The mobility may be determined on the basis of a measured speed of the terminal device or by the time interval the terminal device stays in one wireless network. If the terminal device changes the wireless network more rapidly than a determined threshold, the process of FIG. 5 may be disabled.

Figure 6:
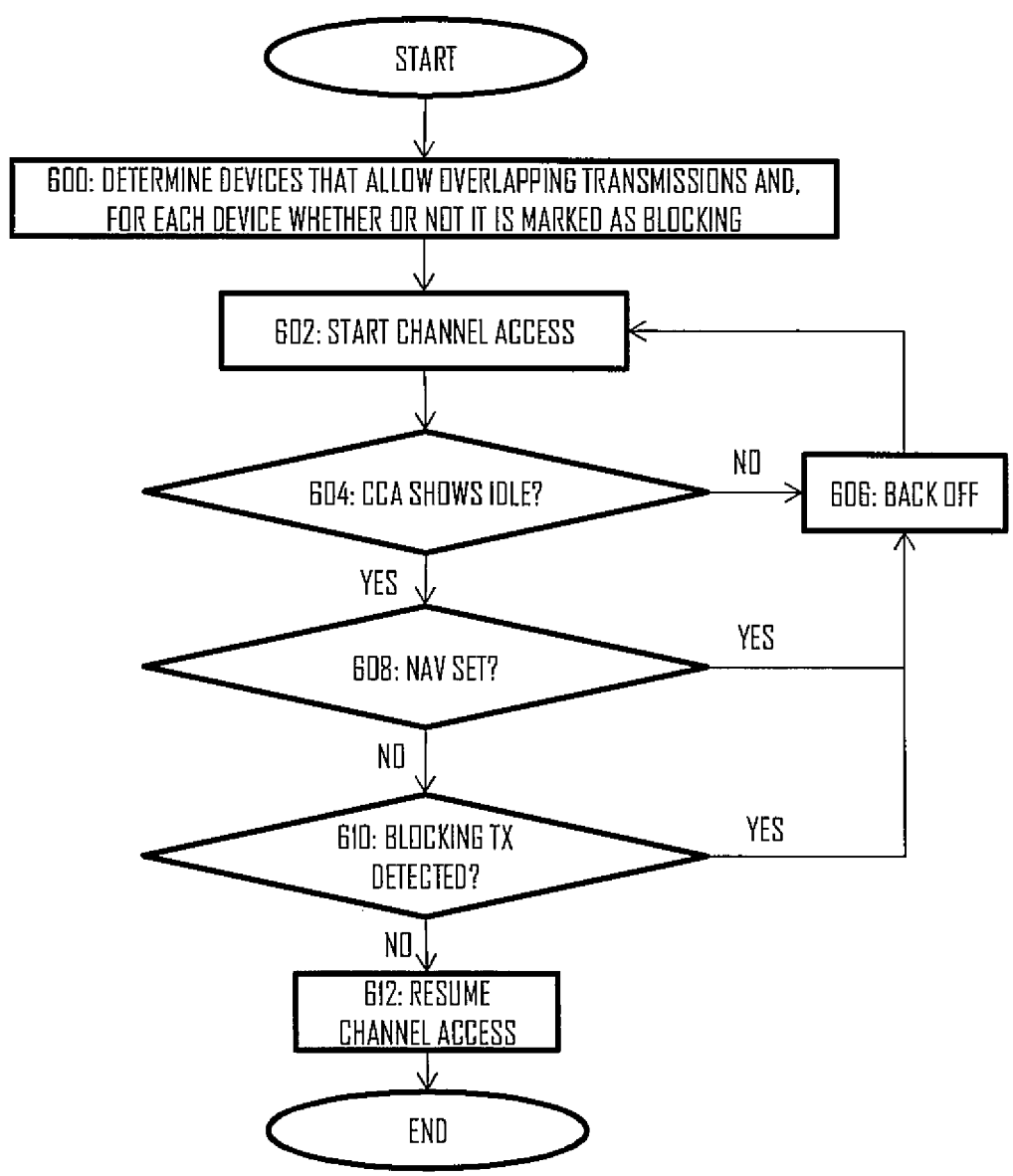
FIGS. 6 and 7 illustrate channel access procedures according to some embodiments of the invention.
Figure 7:
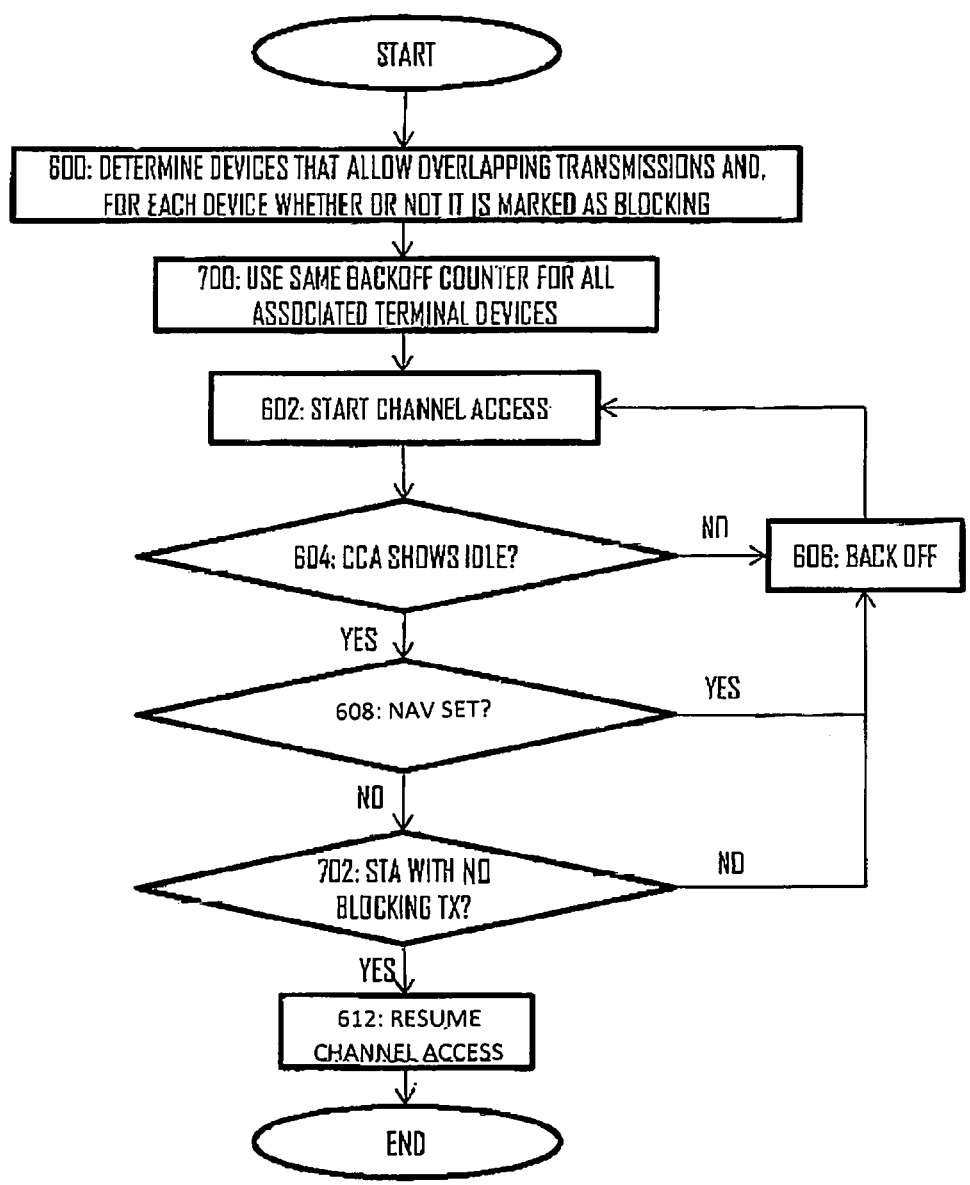

Let us now describe the channel access under the situation described above first in the terminal device (FIG. 6) and then in the access node (FIG. 7). Referring to FIG. 6, the terminal device may determine that overlapping transmissions with one or more devices of another wireless network are allowed. Then, the terminal device may determine for those devices whether or not one or more of those devices are associated with an instruction to refrain from overlapping transmissions (block 600). Upon starting a channel access in block 602, the terminal device may resume the channel access (block 612), if the CCA procedure shows that the channel is idle (yes in block 604), if there is no NAV set for the channel (no in block 608), and if there is not detected a frame transmission to/from a device associated with an instruction to refrain from overlapping transmissions (no in block 610). Otherwise, the terminal device may back off from the channel access (block 606). If the blocking transmission is detected in block 610, the terminal device may enter a power-save mode for a determined duration.

Block 604 may comprise performing the CCA procedure and selecting a CCA threshold based on determining whether or not a device allowing overlapping transmissions has been detected to be carrying out the transmission. If no such device is detected, the terminal device may employ one CCA threshold and, if such a device is detected, the terminal device may employ another CCA threshold.

Block 610 may comprise scanning for frames transmitted by other devices. Upon detecting a frame, the terminal device may cross-reference an identifier comprised in the frame with an identifier associated in block 600 with the devices for which the overlapping transmissions are prevented although the devices allow the overlapping transmissions. In embodiments where the devices are identified with a transmitter address in block 600, the terminal device may extract a transmitter address of the received frame in block 610. Similarly, if the devices are identified with a receiver address, group identifier, or association identifier in block 600, the terminal device may extract a corresponding identifier of the received frame in block 610.

Referring to FIG. 7, the access node may carry out block 600 in the above-described manner. In block 700, the access node selects a back-off counter such that the same back-off counter is used for all terminal devices associated with the access node. In block 602, the access node starts the channel access in order to transmit a frame. The access node may resume the channel access (block 612), if the CCA procedure shows that the channel is idle (yes in block 604), if there is no NAV set for the channel (no in block 608), and if there is at least one terminal device with which there is detected no overlapping transmission that blocks correct reception of a frame (yes in block 702).

In another embodiment, the access node may employ a unique back-off counter for each terminal device and, in such an embodiment, the access node may carry out the channel access according to the procedure of FIG. 6. A plurality of procedures of FIG. 6 may be carried out in parallel, one procedure for each terminal device and the access node may determine the terminal device to which the frame shall be transmitted on the basis of which back-off counter allows the channel access first.

Figure 8A:
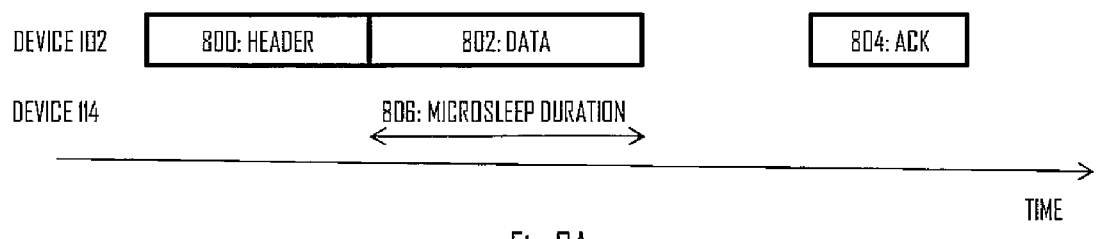
FIGS. 8A to 8C illustrate embodiments of a duration for an apparatus to perform other duties or power-saving upon determining not to carry out overlapping transmission.
Figure 8B:
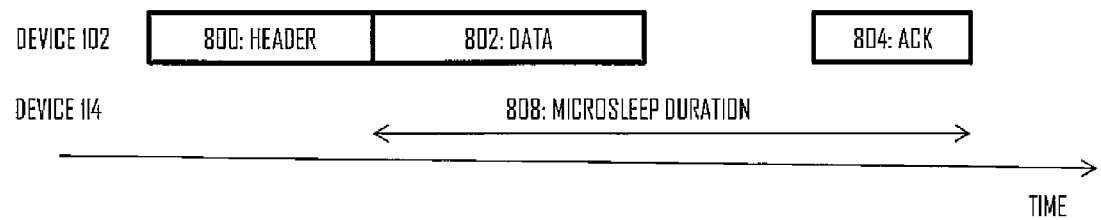
Figure 8C:
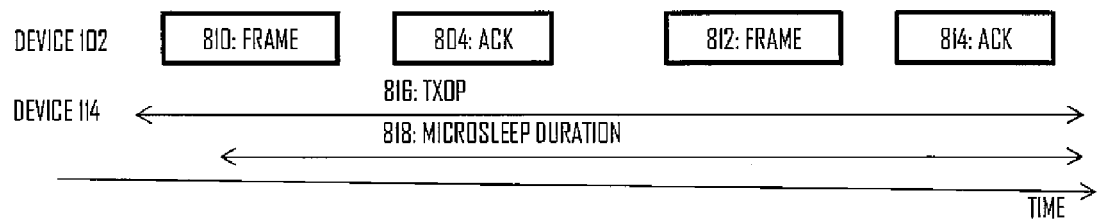

Let us now determine the duration of the micro-sleep of block 312 or the duration the device operates in another wireless network upon detecting a transmission for which overlapping transmission is prevented according to embodiments of the invention. FIGS. 8A to 8C illustrate embodiments of the duration. Upon detecting a frame associated with a transmission with which an apparatus refrains from overlapping transmission according to the process of any one of FIGS. 2 to 5, the apparatus may determine from a header 800 of the frame that a transmitter of the frame allows overlapping transmission and from an identifier comprised in the frame that the apparatus shall refrain from overlapping transmission. As a consequence, the apparatus may enter the micro-sloop for the duration of the frame 806 comprising the header 800 and a data section 802 (FIG. 8A). The duration of the frame may be defined in the header 800 from which the apparatus may determine the micro-sleep duration 806. After the frame has ended, the apparatus may attempt channel access. There may be an acknowledgment frame 804 acknowledging reception of the frame that further prevents the apparatus from gaining channel access.

In the embodiment of FIG. 8B, the apparatus stays in the micro-sleep for the duration 808 of the frame and the acknowledgment 804. The micro-sleep duration may be computed from the frame duration specified in the header 800 and knowledge that there is a specified time interval, e.g. a short inter-frame space (SIFS) in 802.11 networks, between the frame and the acknowledgment 804 and the known duration of the acknowledgment 804.

In the embodiment of FIG. 8C, the apparatus stays in the micro-sleep for the duration 818 of the TXOP associated with the frame 810. The TXOP may span over multiple frame transmissions 810, 812 and associated acknowledgments 804, 814. The duration of the TXOP may be specified in the header 800 of the frame 810.

Figure 9:
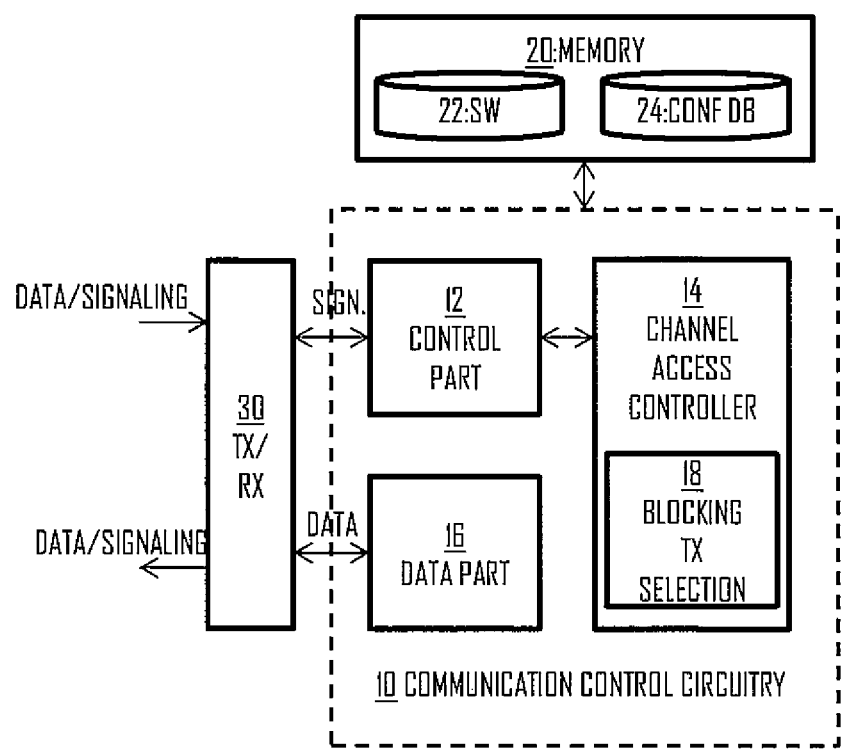
FIG. 9 illustrates a block diagram of a structure of an apparatus according to an embodiment of the invention.

FIG. 9 illustrates an embodiment of an apparatus comprising means for carrying out the above-mentioned functionalities of the wireless device, e.g. a terminal device, user equipment, a client device, or the access node. The wireless device may comply with specifications of an IEEE 802.11 network and/or another wireless network. The wireless device may also be a cognitive radio apparatus capable of adapting its operation to a changing radio environment, e.g. to changes in parameters of another system on the same frequency band. The wireless device may be or may be comprised in a computer (PC), a laptop, a tablet computer, a cellular phone, a palm computer, an access point, a base station, or any other apparatus provided with radio communication capability. In another embodiment, the apparatus carrying out the above-described functionalities of the wireless device is comprised in such a wireless device, e.g. the apparatus may comprise a circuitry, e.g. a chip, a chipset, a processor, a micro controller, or a combination of such circuitries in the wireless device.

Referring to FIG. 9, the apparatus may comprise a communication controller circuitry 10 configured to control wireless communications in the wireless device. The communication controller circuitry 10 may configure the establishment, operation, and termination of connections or associations in the apparatus, as described above. The communication controller circuitry 10 may comprise a control part 12 handling control signalling communication with respect to transmission, reception, and extraction of control or management frames including beacon messages, request messages, response messages, scanning or probing messages, RTS messages, and clear-to-send (CTS) messages. The control part 12 may also carry out processing of headers of data frames. The communication controller circuitry 10 may further comprise a data part 16 that handles transmission and reception of payload data when the apparatus is associated to one or more other wireless devices.

The communication control circuitry 10 may further comprise a channel access controller 14 configured to determine transmission opportunities of the wireless device. The channel access controller 14 may employ the above-described channel sensing procedure (CCA procedure) in which the channel is sensed for conflicting frame transmissions that prevent the channel access of the wireless device. The channel access controller 14 may comprise a threshold selector circuitry 18 for selecting the reception sensitivity threshold (e.g. the CCA threshold) in the above-described manner. The control part 12 may be configured to monitor for frames transmitted by other wireless devices and extract one or more information elements indicating the allowance of the overlapping transmissions. The control part 12 may output such information elements or information contained in such information elements to the channel access controller 14. The selector circuitry of the channel access controller 14 may then select which one of a plurality of reception sensitivity thresholds to employ at a time. Upon determining to attempt channel access, the channel access controller 14 may control the control part 12 to carry out the channel sensing and determine whether or not a signal stronger than the reception sensitivity threshold currently selected by the selector circuitry is detected.

The channel access controller 14 may comprise a blocking transmission selection circuitry 18 configured to determine, among those transmissions for which overlapping transmissions are considered to be allowed, whether or not one or more such transmissions cause interference that prevent correct reception of frames when the overlapping transmission is realized. In an embodiment, the circuitry 18 may receive an instruction from another apparatus through the control part 12 to refrain from overlapping transmissions associated with specified one or more identifiers. In another embodiment, the circuitry 18 may determine the transmissions blocking correct frame reception on the basis of measurements, as described above. In the latter embodiment, the circuitry 18 may then cause the control part 12 to transmit a frame comprising an identifier associated with each such blocking transmission and the above-described instruction to refrain from overlapping frame transmissions upon detecting said identifier in a frame that would otherwise allow overlapping transmissions.

Upon determining that the channel is idle and that no blocking transmissions are detected, the channel access controller 14 may initiate frame transmission.

The channel access controller circuitry 14 and the blocking transmission selection circuitry 18 may be configured to carry out the above-described embodiments in the Apparatus 1, Apparatus 2, access node 100, or one of the terminal devices 112, 114. Depending on the embodiment, the functionality of these circuitries 14, 18 may be different.

The circuitries 12 to 18 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 12 to 18 or all of them.

The apparatus may further comprise a memory 20 that stores computer programs (software) 22 configuring the apparatus to perform the above-described functionalities of the wireless device. The memory 20 may also store communication parameters and other information needed for the wireless communications. The memory 20 may store a configuration database 24 storing configuration parameters of a wireless network of the wireless device. The configuration database may store, for example, a plurality of reception sensitivity threshold values and rules when to apply each threshold value. The rules may comply with the above-described embodiments for using the plurality of thresholds (e.g. CCA thresholds). The configuration database 24 may further store rules for carrying out the overlapping transmissions upon detecting that another wireless device has allowed the overlapping transmissions. The configuration database 24 may further store rules for allowing other wireless devices to carry out transmissions that overlap with a transmission by the apparatus. The configuration database 24 may further store identifiers of the devices that allow overlapping transmissions but that are considered to block correct reception of frames in the wireless network of the apparatus.

The apparatus may further comprise radio interface components 30 providing the apparatus with radio communication capabilities within one or more wireless networks. The radio interface components 30 may comprise standard well-known components such as an amplifier, filter, frequency-converter, (de)modulator, and encoder/decoder circuitries and one or more antennas. The apparatus may in some embodiments further comprise a user interface enabling interaction with the user of the communication device. The user interface may comprise a display, a keypad or a keyboard, a loudspeaker, etc.

In an embodiment, the apparatus carrying out the embodiments of the invention in the wireless device comprises at least one processor 10 and at least one memory 20 including a computer program code 22, wherein the at least one memory and the computer program code are configured, with the at least one processor, to cause the apparatus to carry out the functionalities of the wireless device according to any one of the embodiments of FIGS. 2 to 9. According to an aspect, when the at least one processor 10 executes the computer program code, the computer program code causes the apparatus to carry out the functionalities of the wireless device according to any one of the embodiments of FIGS. 2 to 8. According to another embodiment, the apparatus carrying out the embodiments of the invention in the wireless device comprises the at least one processor 10 and at least one memory 20 including a computer program code 22, wherein the at least one processor 10 and the computer program code 22 perform the at least some of the functionalities of the wireless device according to any one of the embodiments of FIGS. 2 to 8. Accordingly, the at least one processor, the memory, and the computer program code form processing means for carrying out embodiments of the present invention in the wireless device. According to yet another embodiment, the apparatus carrying out the embodiments of the invention in the wireless device comprises a circuitry including at least one processor 10 and at least one memory 20 including computer program code 22. When activated, the circuitry causes the apparatus to perform the at least some of the functionalities of the wireless device according to any one of the embodiments of FIGS. 2 to 8.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIGS. 2 to 8 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
    detecting, by a first apparatus of a first wireless network on the basis of a first criterion, that transmissions performed simultaneously with a second apparatus of a second wireless network are allowed, wherein the first criterion is detection of a frame from the second apparatus, the frame comprising an information element explicitly indicating that the second apparatus allows simultaneous frame transmissions;
    determining, on the basis of a second criterion different from the first criterion, to prohibit frame transmissions simultaneous with frame transmissions of the second apparatus;
    upon said determining, causing transmission of a control message in the first wireless network, wherein the control message comprises an instruction to refrain from transmissions simultaneously with the second apparatus.

2. The method of claim 1, wherein the control message comprises an identifier of the second apparatus.

3. The method of claim 1, further comprising:
    acquiring, in the first apparatus, a response to the control message from a third apparatus of the first wireless network, wherein the response comprises an indication of whether or not the third apparatus is able to detect transmissions of the second apparatus;
    upon determining, by the first apparatus on the basis of the response, that the third apparatus is able to detect the transmissions of the second apparatus, enabling a power-save mode during the transmissions of the second apparatus.

4. The method of claim 1, wherein the first apparatus is an access node of the first wireless network.

5. The method of claim 1, wherein the first apparatus is a terminal device of the first wireless network, wherein the control message is transmitted to another terminal device of the first wireless network, and wherein the method further comprises
    in the first apparatus: acquiring a response to the control message from the other terminal device, wherein the response comprises an indication of whether or not the other terminal device is able to detect transmissions of the second apparatus.

6. A method comprising:
    detecting, by a first apparatus of a first wireless network on the basis of a first criterion, that transmissions performed simultaneously with a second apparatus of a second wireless network are allowed, wherein the first criterion is detection of a frame from the second apparatus, the frame comprising an information element explicitly indicating that the second apparatus allows simultaneous frame transmissions;
    determining, in the first apparatus on the basis of a set of rules comprising at least one rule, that a frame transmission, simultaneous with a frame transmission of the second apparatus, to a third apparatus of the first wireless network is prohibited;
    in response to said determining, refraining the transmission to the third apparatus at least for the duration of the frame transmission of the second apparatus.

7. The method of claim 6, wherein at least one rule in the set of rules is received in a control message from an access node of the first wireless network.

8. The method of claim 7, wherein the control message comprises an instruction to refrain from frame transmissions simultaneous with the second apparatus, the method further comprising:
    causing transmission of a response to the control message, wherein the response comprises an indication of whether or not the first apparatus is able to detect frame transmissions of the second apparatus.

9. The method of claims 6, further comprising:
    determining, in the first apparatus on the basis of the set of rules, that a frame transmission, simultaneous with a frame transmission of the second apparatus, to a fourth apparatus is allowed; and causing said frame transmission to the fourth apparatus simultaneously with the frame transmission of the second apparatus.

10. An apparatus comprising:

at least one processor; and at least one memory including a computer program code, wherein the at least one memory and the computer program code are configured, with the at least one processor, to cause the apparatus to:

detect, on the basis of a first criterion, that transmissions performed in a first wireless network simultaneously with a second apparatus of a second wireless network are allowed, wherein the first criterion is detection of a frame from the second apparatus, the frame comprising an information element explicitly indicating that the second apparatus allows simultaneous frame transmissions;

determine, on the basis of a second criterion different from the first criterion, to prohibit frame transmissions simultaneous with frame transmissions of the second apparatus;

upon said determining, cause transmission of a control message in the first wireless network, wherein the control message comprises an instruction to refrain from transmissions simultaneously with the second apparatus.

11. The apparatus of claim 10, wherein the control message comprises an identifier of the second apparatus.

12. The apparatus of claims 10, wherein the at least one memory and the computer program code are configured, with the at least one processor, to cause the apparatus to:

acquire a response to the control message from a third apparatus of the first wireless network, wherein the response comprises an indication of whether or not the third apparatus is able to detect transmissions of the second apparatus;

upon determining, on the basis of the response, that the third apparatus is able to detect the transmissions of the second apparatus, enable the apparatus to enter a power-save mode during the transmissions of the second apparatus.

13. The apparatus of claims 10, wherein the apparatus is an access node of the first wireless network.

14. The apparatus of claim 10, wherein the apparatus is a terminal device of the first wireless network, wherein the at least one memory and the computer program code are configured, with the at least one processor, to cause the apparatus to:

transmit the control message to another terminal device of the first wireless network; acquire a response to the control message from the other terminal device, wherein the response comprises an indication of whether or not the other terminal device is able to detect transmissions of the second apparatus.

15. An apparatus comprising:

at least one processor; and at least one memory including a computer program code, wherein the at least one memory and the computer program code are configured, with the at least one processor, to cause the apparatus to:

detect on the basis of a first criterion that transmissions performed in a first wireless network simultaneously with a second apparatus of a second wireless network are allowed, wherein the first criterion is detection of a frame from the second apparatus, the frame comprising an information element explicitly indicating that the second apparatus allows simultaneous frame transmissions;

determine, on the basis of a set of rules comprising at least one rule, that a frame transmission, simultaneous with a frame transmission of the second apparatus, to a third apparatus of the first wireless network is prohibited;

in response to said determining, refrain the transmission to the third apparatus at least for the duration of the frame transmission of the second apparatus.

16. The apparatus of claim 15, wherein at least one rule in the set of rules is received in a control message from an access node of the first wireless network.

17. The apparatus of claim 16, wherein the control message comprises an instruction to refrain from frame transmissions simultaneous with the second apparatus, and wherein the at least one memory and the computer program code are configured, with the at least one processor, to cause the apparatus to: cause transmission of a response to the control message, wherein the response comprises an indication of whether or not the apparatus is able to detect frame transmissions of the second apparatus.

18. The apparatus of claims 15, wherein the at least one memory and the computer program code are configured, with the at least one processor, to cause the apparatus to:

determine, on the basis of the set of rules, that a frame transmission, simultaneous with a frame transmission of the second apparatus, to a fourth apparatus is allowed; and cause said frame transmission to the fourth apparatus simultaneously with the frame transmission of the second apparatus.

* * * * *